United States Patent [19]

Klein

[11] Patent Number: 4,768,708
[45] Date of Patent: Sep. 6, 1988

[54] HEATING SYSTEM FOR VEHICLES, ESPECIALLY MOTOR VEHICLES, AND METHOD OF MAKING THE SAME

[75] Inventor: Michael Klein, Wiesbaden, Fed. Rep. of Germany

[73] Assignee: General Motors Corporation, Detroit, Mich.

[21] Appl. No.: 82,436

[22] Filed: Aug. 6, 1987

[30] Foreign Application Priority Data

Sep. 3, 1986 [DE] Fed. Rep. of Germany ....... 3629940

[51] Int. Cl.⁴ .............................................. B60H 1/02
[52] U.S. Cl. ........................... 237/12.3 B; 237/12.3 A
[58] Field of Search ..................... 237/12.3 A, 12.3 B; 98/2, 2.05, 2.08

[56] References Cited

U.S. PATENT DOCUMENTS 4,533,081 8/1985 Forsting et al. ................ 237/12.3 B

*Primary Examiner*—Henry Bennett
*Attorney, Agent, or Firm*—R. L. Phillips

[57] ABSTRACT

A heating system in a motor vehicle having an engine mounted in front and has a heater enclosure which is arranged on the fire wall on the side facing the occupant compartment and houses a heat exchanger that is connected to the cooling water circuit of the engine. The heater enclosure is open at the end facing the fire wall and is fastened to the fire wall so that its open end surrounds a corresponding opening provided in the fire wall. The heat exchanger extends from the engine compartment through the opening in the fire wall into the inside of the heater enclosure. The installation of the heat exchanger into the heater enclosure proceeds in conjunction with the assembly of the modular-type vehicle.

9 Claims, 3 Drawing Sheets

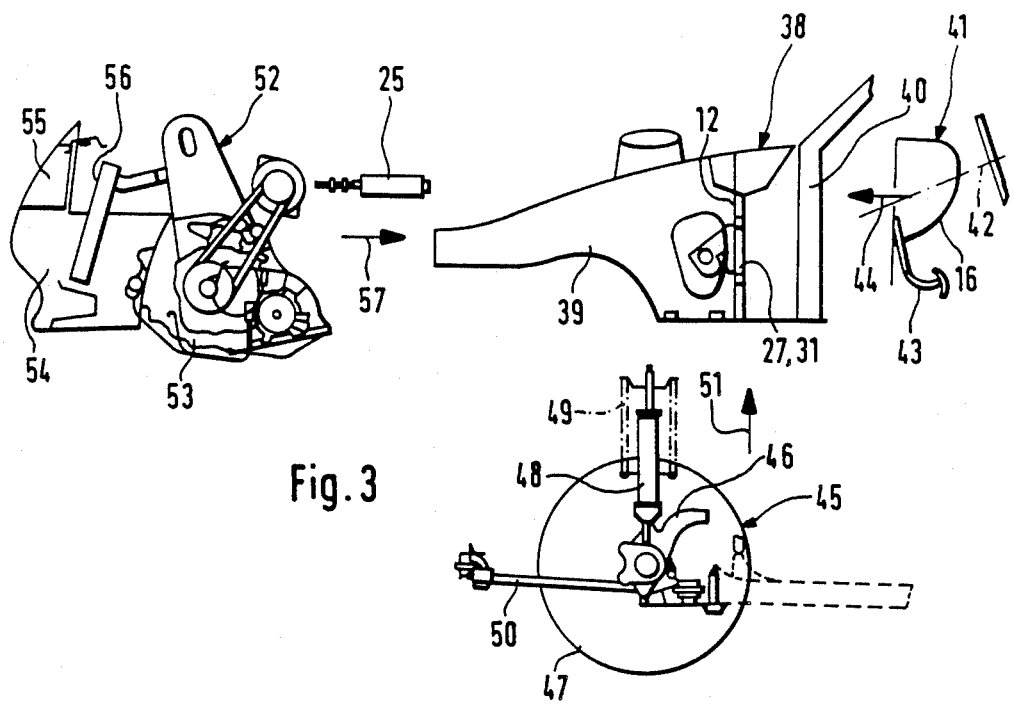
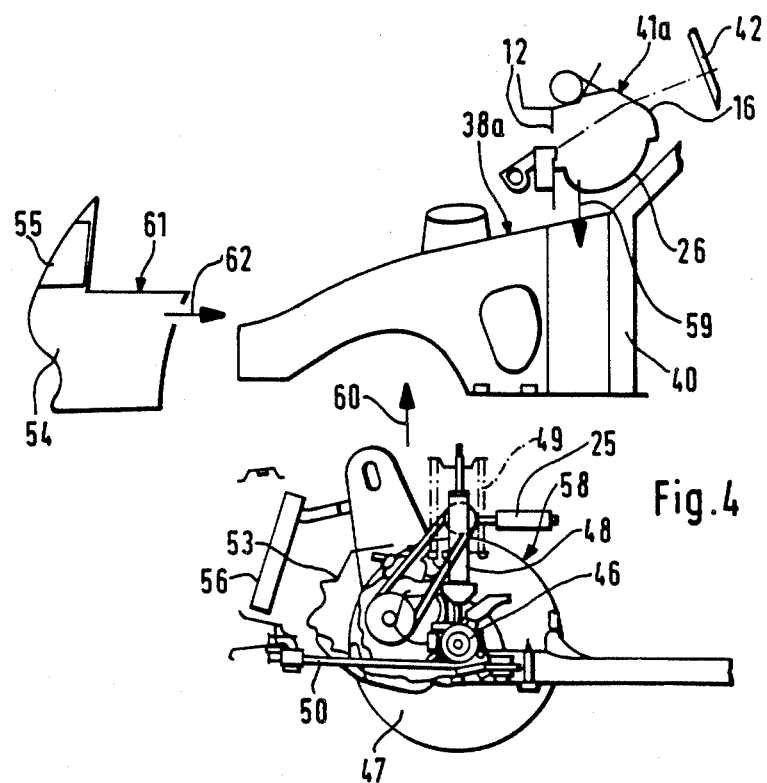
Fig. 3
Fig. 4

HEATING SYSTEM FOR VEHICLES, ESPECIALLY MOTOR VEHICLES, AND METHOD OF MAKING THE SAME

TECHNICAL FIELD

This invention relates to a heating system for vehicles, especially motor vehicles of the type in which the engine is mounted in front, including a heater enclosure secured to the fire wall on the side facing the occupant compartment, and including a heat exchanger mounted inside the heater enclosure and connected to the engine cooling system.

BACKGROUND OF THE INVENTION

The assembly of motor vehicles of the type that have been designed on the basis of modular construction principles allows the module containing the engine, i.e., the engine module, to be inserted into the vehicle body vertically from below or above, or horizontally from the front. In the case of prior art modular vehicle designs, the arrangement has been such that the heating system, consisting of the heat exchanger and the enclosure surrounding same, was being completely pre-assembled on one side of the fire wall, i.e., the side facing the occupant compartment, and the fire wall was part of the so-called cockpit module. Since the heat exchanger of the heating system is an integral component of the engine cooling water circuit, this prior art modular design concept does not provide for the ability to conduct, prior to final installation of the engine module into the vehicle body, engine test runs and other testing procedures for ascertaining proper operation of all engine functions, because such tests would require the heat exchanger to be connected to the engine cooling system. In other words, the arrangement wherein the heat exchanger of the heating system is mounted on the side of the fire wall facing the occupant compartment and is part of the cockpit module rather than part of the engine module, does not permit the engine cooling water system, prior to installation of the engine into the vehicle body, to be closed so that the necessary engine tests can be conducted.

SUMMARY OF THE INVENTION

It is an object of the present invention to provide a heating system of the type described above that will enable all engine tests to be conducted externally.

This object is accomplished by the heater enclosure having its end facing the fire wall shaped into an opening and being fastened to the fire wall in such a manner that this opening encloses a correspondingly shaped opening formed in the fire wall, and in that the heat exchanger is adapted for insertion from the engine compartment side through the opening in the fire wall so as to extend into the heater enclosure.

This arrangement renders it possible to provide a functionally integral engine assembly which incorporates all functionally critical components, which can be tested externally and which does not have to be disassembled any more. Thus, defects can be detected and the necessary corrections and adjustments be made in a simple and cost-saving manner before the engine is installed in the vehicle body. The arrangement also enables to substantial reduction in assembly time.

To convert the concept of the invention into practice, it is proposed that the opening of the fire wall be provided with a tapered portion which is directed towards the occupant compartment, and that the opening of the heater enclosure be provided with a corresponding flared portion which is directed towards the fire wall. The tapered portion and the flared portion serve as a means to provide that the open end of the heater enclosure is properly centered with respect to the opening of the fire wall. The invention also proposes that the heater enclosure be provided with a flange which adjoins the flared opening and which serves as a means by which the heater housing is threadedly connected to the fire wall in the area surrounding the opening of the fire wall. The concentric alignment of the two openings, i.e., the opening of the fire wall and that of the heater housing, which are disposed at the level of the heat exchanger, will enable the heat exchanger, which is already connected to the engine, to be inserted from the front into the heater enclosure after the testing of all critical engine functions has been completed.

The invention further proposes that after installation of the engine, and thus also the heat exchanger, the openings in the fire wall and the heater enclosure be closed by a pre-assembled cover member which includes suitable vibration and noise absorbing elements. In order to utilize the concept of the invention to best advantage, it is also proposed that the heat exchanger carry at its rearward end an elastomeric damping element which is adapted, after installation of the heat exchanger, to sealingly close the mutually aligned openings, i.e., the opening of the fire wall and that of the heater enclosure. Thus, the elastomeric element functions as a closure member for the heater enclosure as well as a vibration and noise absorbing element.

Preferably, a second damping element is arranged on the inner side of the rearwardly disposed wall of the heater enclosure which, in the installed position of the heat exchanger, is in engagement with the forward end of the heat exchanger. The purpose of the additional damping element is to control objectionable noise that may be generated by the heating ducts an transmitted to the rearward end of the heater enclosure.

The invention also relates to a method of making a heating system of the type described above, namely, a heating system that is adapted to be installed into a motor vehicle of the type wherein the fire wall is part of the body and wherein the engine module contains the engine as well as the engine cooling system. In accordance with the invention, the method of making the heating system is characterized in that the heater enclosure, together with the second damping element, is mounted on the fire wall of the vehicle body, and the heat exchanger, together with the first damping element, is mounted on the engine module, and in that installation of the engine module, together with the heat exchanger including the first damping element, proceeds with the engine module being moved horizontally from the front into its installation position into the body, and that in the course of this movement, the heat exchanger is moved through the mutually aligned openings, i.e., the fire wall opening and the heater enclosure opening, and placed inside the heater enclosure.

DETAILED DESCRIPTION OF PREFERRED EMBODIMENTS

Other objects, features and advantages will become more apparent from the following description with reference to the accompanying drawings which illustrate exemplary embodiments of the invention.

FIG. 3 is a side view of an exemplary embodiment which illustrates the assembly procedure of several pre-assembled modules.

FIG. 4 is an alternative modular construction method.

Figure 1:
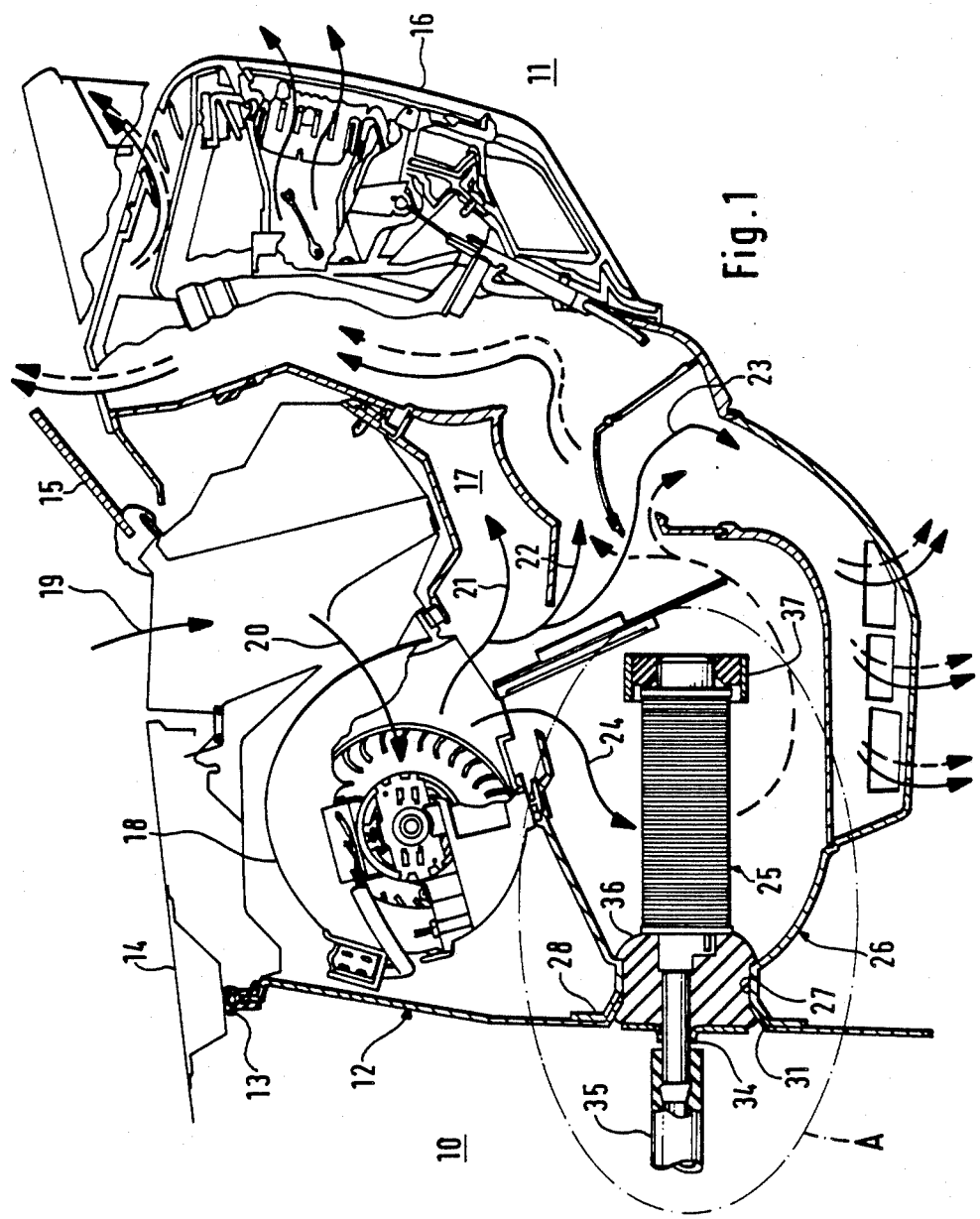
FIG. 1 is a vertical section of the portion of the vehicle body which contains the heating system.

Referring to FIG. 1, numeral 10 illustrates the engine compartment and numeral 11 the occupant compartment of a passenger car. The engine compartment 10 and the occupant compartment are separated by a fire wall 12. Numeral 14 denotes an engine hood which, when in the closed position, contacts a sealing element 13 provided on the fire wall 12. FIG. 1 also illustrates a windshield 15 and a dashboard 16 of the subject passenger car. Numeral 17 designates a space which extends between the fire wall 12 and the instrument board 16. This space is provided for accommodating the heating and ventilating system of the vehicle. A blower 18, which is part of the heating and ventilating system, is adapted to draw in fresh air from the outside (see arrows 19, 20) and, as indicated in FIG. 1 by arrows 21-24, to forward that air to other components of the heating and/or ventilating system. The engine compartment 10 and the fresh air intake 19, 20 of the blower 18 are sealed off from each other by the seal 13 arranged between the fire wall 12 and the hood 14.

Figure 2:
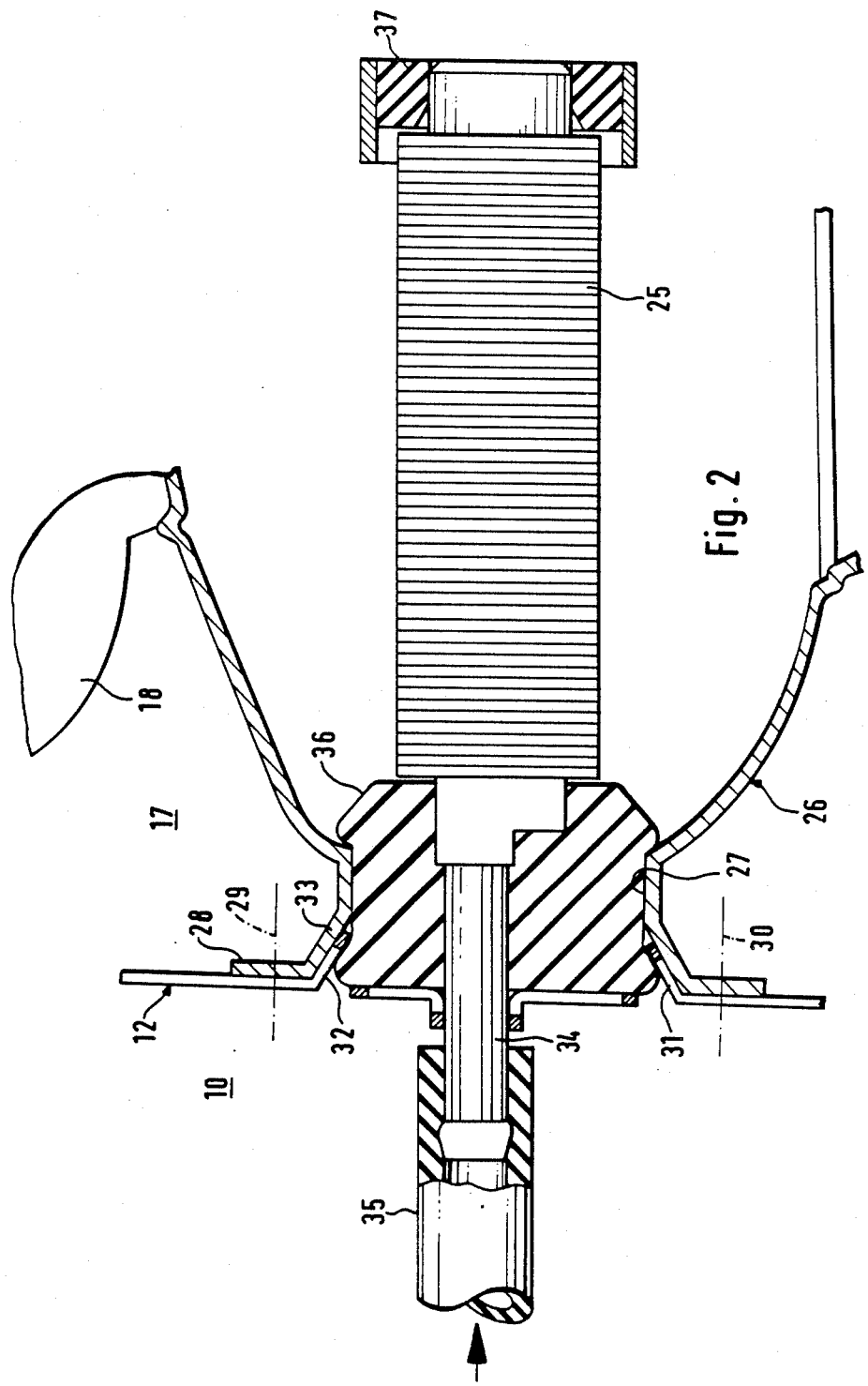
FIG. 2 is an enlarged view of the detail denoted in FIG. 1 by the letter "A".

One major component of the heating and ventilating system is the heater (see also FIG. 2). It consists, generally, of a heat exchanger 25 that is connected to the cooling water circuit and is surrounded by a heater enclosure 26. The heater enclosure 26 has an opening 27 at the end facing the fire wall 12, and a flange-like edge 28 which surrounds the opening. The flange-like edge 28 is used to threadedly fasten the heater housing 26 to the fire wall 12 at 29, 30 (see FIG. 2). The fire wall 12 is provided with an opening 31 which is complementary in size and shape to the opening 27 of the heater enclosure 26. Both openings are in concentric alignment with each other, which is accomplished by a tapered portion 32 on the fire wall 12 and a complementary flared portion 33 on the heater enclosure 26.

As is also apparent from FIGS. 1 and 2, the heat exchanger 25 extends through the mutually aligned openings 31, 27 from the engine compartment 10 into the heater enclosure 26. The heat exchanger 25 is provided with a neck 34 to which a cooling water hose 35 is connected so that heated cooling water can flow from the engine cooling system into the heat exchanger 25. The neck 34 is surrounded in the region of the mutually aligned openings 31, 27 by an elastomeric damping element 36 which sealingly closes these openings and functions at the same time as a cover member for the heater enclosure 26 at the end facing the fire wall 12. A second damping element, denoted by the numeral 37, is arranged at the other end of the heat exchanger 25. Unlike the first damping element 36, the second damping element 37 is associated with the heater enclosure 26, because it is mounted to the heater enclosure 26 already prior to installation of the heat exchanger 25. Preferably, the first damping element 36 as well as the second damping element 37, are made of rubber. When in its installed position, as illustrated in FIGS. 1 and 2, the heat exchanger 25 is fixedly mounted in the heater enclosure 26 between the first damping element 36 and the second damping element 37, the mounting being such that the damping elements 36, 37 are elastically biased against one another. This also causes the openings 27, 31 to be sealingly closed by the first elastic damping element 36, as mentioned above. To effect proper damping and sealing it is advantageous that the first damping element 36 be of the self-centering and the self-locking type.

FIGS. 3 and 4 illustrate two alternative methods of assembling the forward portion of a passenger car. However, the important feature is not the assembly procedure of the forward portion of the passenger car as such, but the alternative methods derived therefrom for installing the heater. In the exemplary embodiment according to FIG. 3, numeral 38 denotes the forward portion of a passenger car body which consists basically of the fire wall 12 mentioned in the foregoing, the wheel wells 39 for the front wheels of the vehicle, and the A-columns 40.

The unit designated in FIG. 3 by the numeral 41 is a so-called cockpit module. It is comprised basically as illustrated schematically of the steering system 42, the above-mentioned instrument board 16, the pedals 43 and the heater enclosure 26 (see FIGS. 1 and 2) which, however, does not yet contain the heat exchanger 25. In the final assembly stage of the forward portion of the passenger car, the cockpit module 41 is inserted in the direction of arrow 44 into and combined with the body 38, and during this procedure the heater enclosure 26 is threadedly attached in the position described above to the fire wall 12 at 29, 30 (see FIGS. 1 and 2). However, the operation according to FIG. 3 can also be carried out if the components 16, 26, 42, 43 are not pre-assembled as a cockpit module, but are installed separately into the body 38 in the conventional manner.

Another module, designated in FIG. 3 by the numeral 45, includes the front axle 46 with front wheels 47, the shock absorbers 48, the suspension springs 49 and the stabilizer 50. This module 45 is inserted as indicated by the arrow 51, vertically from below into the body 38 and is combined with same during final installation.

Finally, a third module is provided which in the following description will be termed the engine module and be designated by the numeral 52. The engine module 52 includes the engine 53, including accessories, furthermore the bumper/spoiler assembly 54 and the headlamps 55, as well as the engine cooling system of which only the radiator 56 is illustrated. However, another component which is also part of the engine cooling system, because it is supplied with heated cooling fluid and permits the heated cooling fluid to flow therethrough, is the previously mentioned heat exchanger 25 for the vehicle heating system (see FIGS. 1 and 2). The heat exchanger 25 for the heating system is also part of the engine module 52, even though it is shown in FIG. 3 separately and spaced apart from the engine module 52. The installation of the engine module 52, including the heat exchanger 25, into the body 38, proceeds from the front in the direction towards the rear of the vehicle, as indicated by the arrow 57. When the engine module 52 is moved for installation into the engine compartment, the heat exchanger 25 is positioned at the same level as the mutually aligned openings 27, 31 (see FIGS. 1 and 2) of the fire wall 12 and the heater enclosure 26, respectively. This arrangement insures that the installation of the heat exchanger 25 into the heater enclosure 26 proceeds coincidentally with the installation of the engine module 52 into the body 38. Since the elastomeric damping material (damping element 36) is of the self-centering and self-locking type, it is compressed when the heat exchanger 25 is inserted into the heater enclosure 26, so that the mutually aligned openings 27, 31 of the fire wall 12 and heater enclosure 26, respectively, are sealingly closed.

In the embodiment according to FIG. 4, the body is comprised of the components 38a and 41a which are illustrated as separate structural units. However, the individual parts contained in the pre-assembled module 41a may also be installed separately, i.e., in the conventional manner, into the body structure 38a, which would not affect the concept of the embodiment under consideration. The fire wall 12, which in the embodiment according to FIG. 4, is part of the module 41a, includes the heater enclosure 26, but not the heat exchanger 25. Instead, the heat exchanger 25 is part of an additional module which is generally designated by the numeral 58. The module 58 is comprised, in addition to the wheel suspension components already mentioned in conjunction with module 45 (FIG. 3), of the engine complete with accessories and cooling system.

In the embodiment according to FIG. 4, the pre-assembled module 41a (so-called cockpit module) is lowered vertically from the above (see arrow 59) into the body 38a and is combined therewith. Subsequently, the module 58 is lifted, also vertically, from below (see arrow 60) into the body 38a. But this lifting movement alone will not accomplish the final installation position of the module 58 relative to the body 38a. To place the module 58 into its final installation position also requires that it be horizontally displaced in the direction towards the rear of the car. When this horizontal rearward displacement occurs, the heat exchanger 25 of the heating system is inserted into the heater enclosure 26 which had previously been placed into its final installation position.

After installation of module 58 is completed, one can proceed with the installation of module 61. Module 61, which is comprised only of the bumper/spoiler assembly 54, is inserted into the body 38a in the direction indicated by arrow 62.

The foregoing description of the preferred embodiments of the invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The embodiments of the invention in which an exclusive property or privilege is claimed are defined as follows:

1. Heating system for vehicles, especially motor vehicles of the type in which an engine is mounted in front in a compartment ahead of a fire wall thereof, including a heat exchanger which is connected to the engine cooling circuit of the engine and has an end facing the fire wall shaped into an opening and fastened to the fire wall so as to enclose a correspondingly shaped opening in the fire wall and wherein the heat exchanger extends from the engine compartment through the opening in the fire wall into the inside of the heater enclosure characterized in that the opening in the fire wall is shaped into a conically tapered portion which extends in the direction of the occupant compartment of the vehicle, and the opening of the heater enclosure has a correspondingly shaped conically flared portion which extends in the direction of the fire wall and in that the conically tapered portion and the conically flared portion serve as a means of centering the heater enclosure and its opening facing the fire wall with respect to the opening formed in the fire wall.

2. Heating system according to claim 1, characterized in that a flange-like edge which adjoins the conically enlarged portion of the heat exchanger serves as a means by which the heater enclosure is threadedly attached to the fire wall in an area immediately surrounding the opening formed in said fire wall.

3. Heating system according to claim 2, characterized in that the heat exchanger is provided at its rearward end with an elastomeric damping element which is adapted, when the heat exchanger is in its installed position, to sealingly close the mutually aligned openings formed, respectively, in the fire wall and the heater enclosure.

4. Heating system according to claim 3, characterized in that a second damping element is arranged on the inner wall of the rearward end of the heater housing, which when the heat exchanger is in the installed position, is in engagement with the forward end of the heat exchanger.

5. Heating system according to claim 4, characterized in that the heat exchanger when in the installed position, is fixedly mounted inside the heater enclosure between the first damping element and the second damping element, the mounting arrangement being such that the heat exchanger exerts a biasing force against both damping elements.

6. Heat exchanger according to claim 5, characterized in that the first damping element and, also the second damping element are made of rubber and are of the self-centering and self-locking type.

7. Method of making a heating system of the type, according to any one of the preceding claims, for use in a motor vehicle with a body containing the fire wall, and with an engine module containing the engine including a cooling system characterized in that the heater enclosure together with the second damping element is pre-installed on the fire wall of the body and the heat exchanger together with the first damping element is pre-installed on the engine module, and in that the engine module together with the heat exchanger, including the first damping element, is inserted horizontally from the front into its installed position into the body, whereby the heat exchanger is moved through the mutually aligned openings of the fire wall and heater enclosure, respectively, and placed inside the heater enclosure.

8. Method according to claim 7, characterized in that installation of the engine module, including the heat exchanger and the first damping element proceeds with the engine module transported along a straight horizontal path of movement, and is placed from the front into its installation position in the vehicle body.

9. Method according to claim 7, for a motor vehicle with an engine module which is comprised, essentially, of an engine, including the cooling system, and of the front wheel suspension, characterized in that the procedure of installing the engine module, including the heat exchanger and the first damping element, involves the steps of first lifting the engine module vertically from below into the vehicle body and then moving it horizontally from the front into its installation position.

* * * * *